United States Patent [19]

Clayton

[11] 4,081,016
[45] Mar. 28, 1978

[54] SIPING MACHINE

[75] Inventor: Andrew Robert Clayton, Salisbury, N.C.

[73] Assignee: Brad Ragan, Inc., Spruce Pine, N.C.

[21] Appl. No.: 701,234

[22] Filed: Jun. 30, 1976

[51] Int. Cl.² .......................................... B29H 21/08
[52] U.S. Cl. .................................................... 157/13
[58] Field of Search ..................... 51/91 R, 92 R, 121, 51/122, 215 CP, 230–232, DIG. 33; 76/43; 83/12; 157/13

[56] References Cited

U.S. PATENT DOCUMENTS

| | | |
|---|---|---|
| 3,528,476 | 9/1970 | Hawkinson ............................ 157/13 |
| 3,537,502 | 11/1970 | Napolitano ............................ 157/13 |
| 3,683,728 | 8/1972 | Meserve .............................. 157/13 X |
| 3,820,580 | 6/1974 | Meserve et al. ....................... 157/13 |
| 3,960,037 | 6/1976 | Stier ..................................... 76/43 |
| 3,965,959 | 6/1976 | Weir ..................................... 157/13 |

Primary Examiner—James L. Jones, Jr.
Assistant Examiner—James G. Smith
Attorney, Agent, or Firm—Bell, Seltzer, Park & Gibson

[57] ABSTRACT

An improvement in a tire siping machine which has a spirally threaded drum mounted for rotation about a first axis, a knife projecting from the drum for cutting a tire brought into engagement with the drum, and an arrangement for supporting a tire in engagement with the drum. In accordance with the improvement of this invention, a shaft defining a second axis about which a tire rotates during drum engagement is supported for linear movement laterally relative to the drum while maintaining a constant predetermined skew relation between the axis of the shaft and the axis of the drum.

3 Claims, 6 Drawing Figures

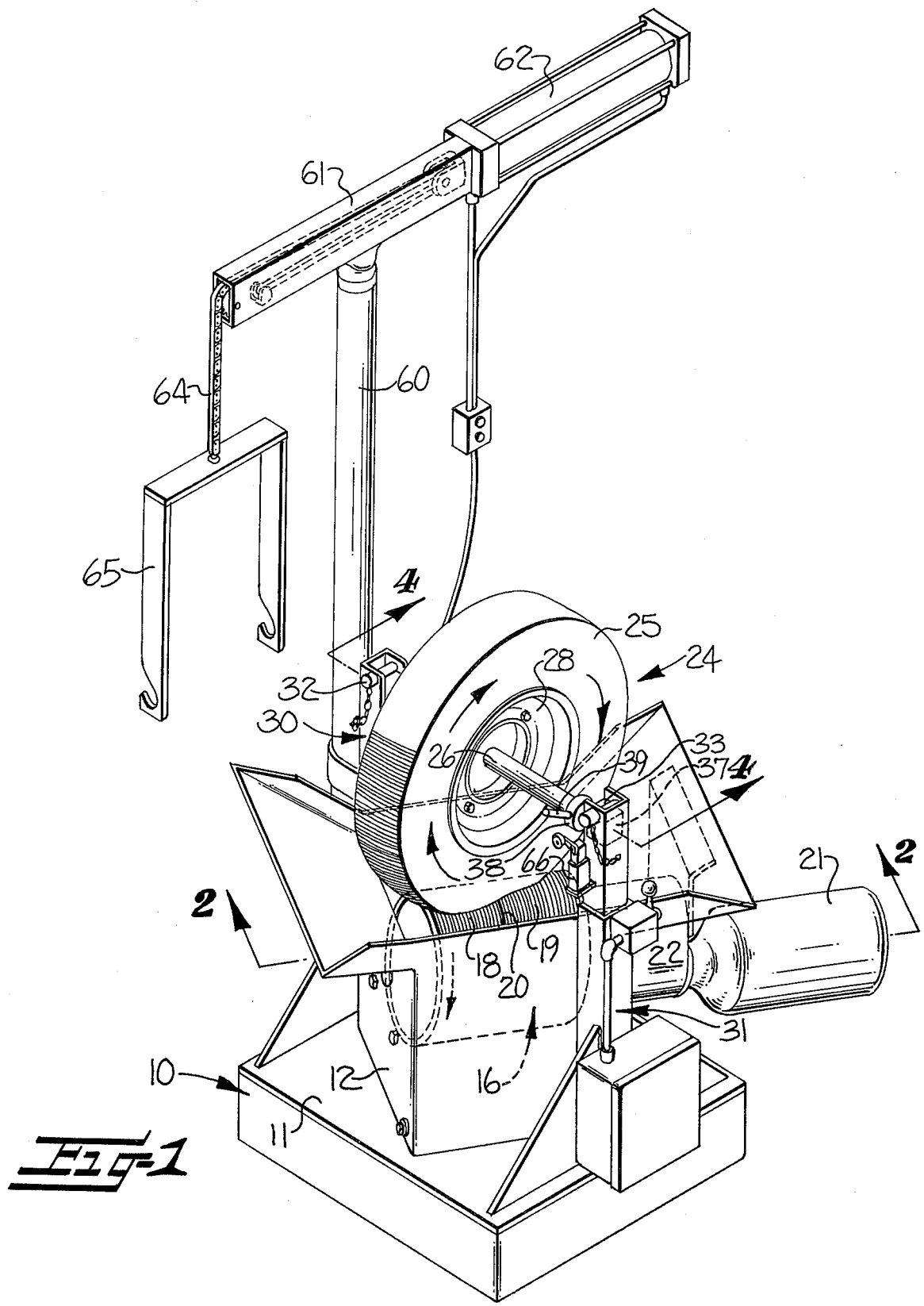

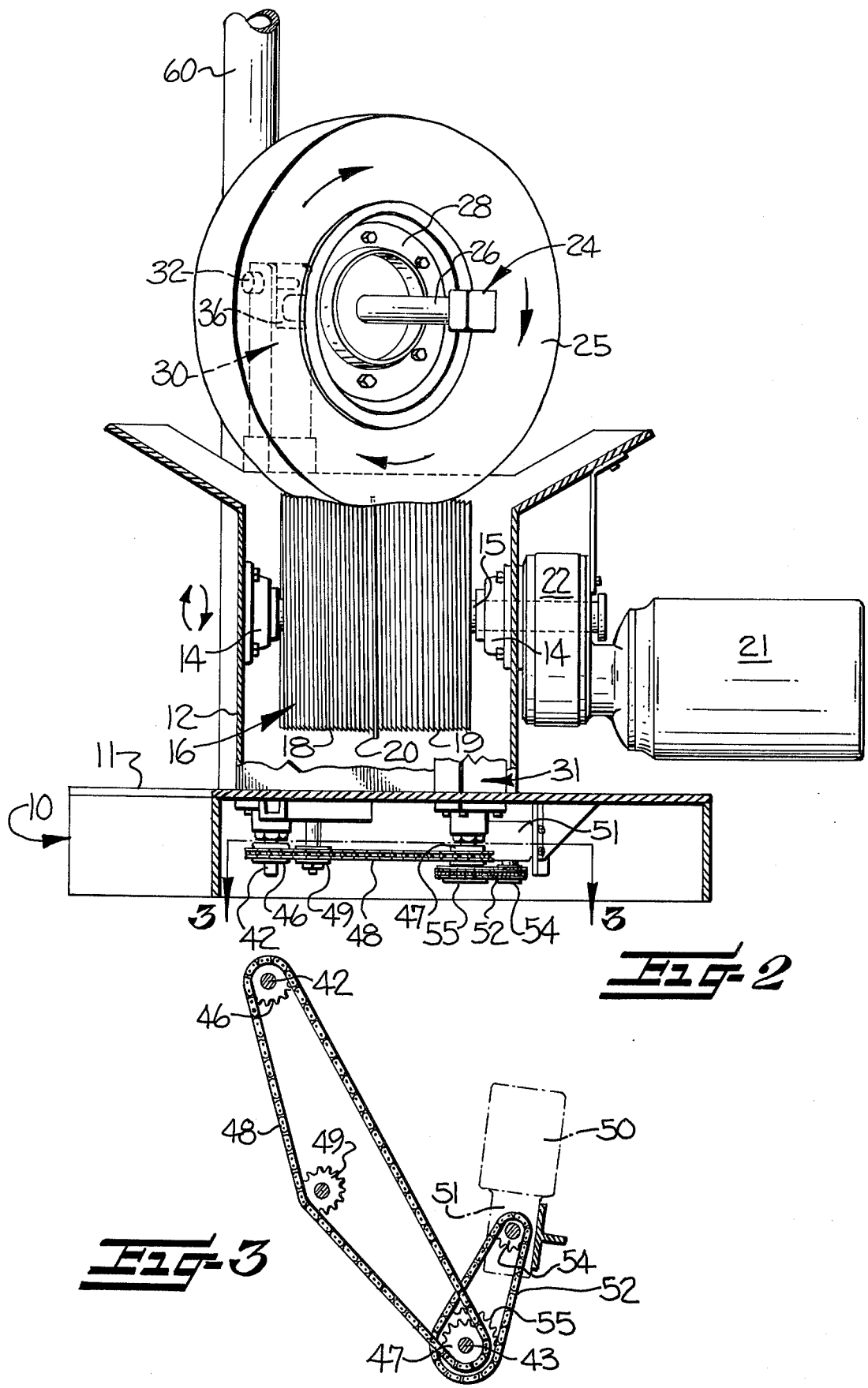

SIPING MACHINE

Improvement in the traction characteristics of tire treads has been sought heretofore by slitting the tread surfaces in accordance with methods and through the use of apparatus first proposed by Sipe and the process and apparatus have come to be identified by the term "siping". Exemplary disclosures of prior tire siping machines may be found in Meserve et al U.S. Pat. Nos. 2,741,037 and 2,863,507. To any extent that the disclosures of those prior patents are deemed necessary or pertinent to a full understanding of the present invention, the disclosures of those prior patents are hereby incorporated by reference into this specification.

The tire siping machines of the two aforementioned patents each provide a pivoting frame by which a tire mounted adjacent a spirally threaded drum may be moved along an arcuate path of travel toward and away from the drum. Where such pivotal movement is relied upon, the skew relation between the axis of rotation of the spirally treaded drum and the axis of rotation of a tire undergoing siping is not and cannot be maintained constant during mounting and processing of a tire. Such inherent differences are particularly pronounced with tires of lesser diameters. As a result, siping cuts into the tread face of a tire will not be uniform as to angulation relative to the tread face and, where more than one rotation of a tire is employed in siping, successive passes of cutting about the tire will not follow one directly after another. Accordingly, the effect on traction of siping a tire is less predictable than is desirable.

Realizing the difficulties which have been encountered with prior tire siping machines, it is an object of this invention to improve the tire mounting arrangements of such a machine by providing spacing means for linearly moving a tire mounting shaft laterally relative to a threaded drum while maintaining the axis of rotation of the shaft in constant predetermined skew relation to the axis of rotation of the drum. In realizing this object of the present invention, siping angles are maintained constant irrespective of the diameter of the tire undergoing siping and the number of siping passes made about the tire.

Yet a further object of this invention is to provide control means for a tire siping machine which will automatically interrupt the siping operation upon completion of a single pass about a tire undergoing siping, thereby eliminating any necessity that an operative closely observe operation of the tire siping machine.

Some of the objects of the invention having been stated, other objects will appear as the description proceeds, when taken in connection with the accompanying drawings, in which FIG. 1 is a perspective view of a tire siping machine in accordance with this invention;

FIG. 2 is an enlarged elevation view through the apparatus of FIG. 1, taken generally along the line 2—2 in FIG. 1;

FIG. 3 is a partial plan view of a portion of the apparatus of FIGS. 2 and 3, taken generally along the line 3—3 in FIG. 2;

While the present invention will be described hereinafter with particular reference to the accompanying drawings, it is to be understood at the outset that the description which follows is intended to be a broad teaching of the present invention directed to persons skilled in the applicable arts. Accordingly, the following description and the accompanying drawings are to be taken as contemplating various modifications in the apparatus of the present invention and not as limiting on the scope of this invention.

Referring now more particularly to the drawings, the tire siping machine in accordance with the present invention comprises a base generally indicated at 10 and including a floor plate 11. Mounted upon the floor plate 11 is a tank 12 having bearings 14 (FIG. 2) mounted on interior surfaces of the walls thereof for receiving a generally horizontal shaft 15. The shaft 15 defines a first axis and mounts a spirally threaded drum generally indicated at 16 for rotation about that axis.

Figure 5:
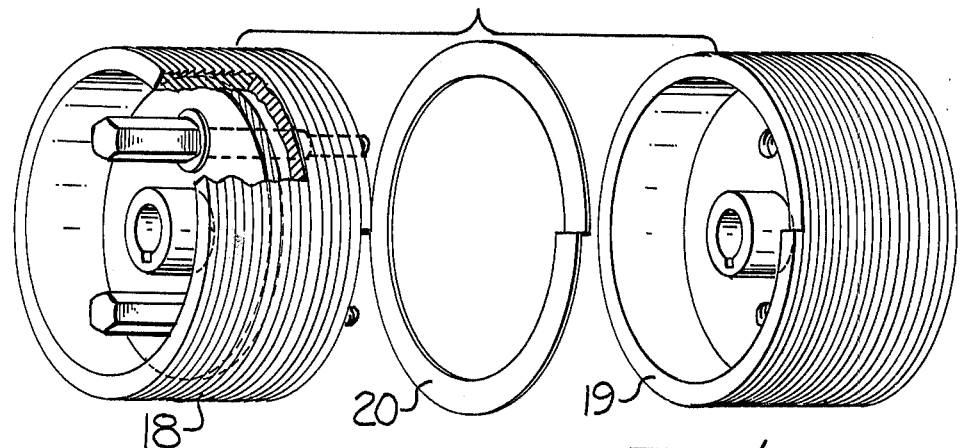
FIG. 5 is an exploded perspective view of a portion of the machine of FIGS. 1 and 2.
Figure 6:
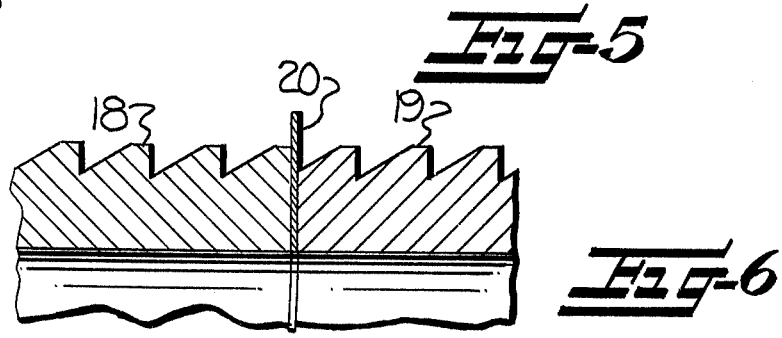
FIG. 6 is an enlarged section view of a portion of the threaded drum of FIGS. 1, 2 and 5.

The spirally threaded drum 16 preferably is formed of two halves 18, 19, each having a threaded outer surface (FIGS 5 and 6). Mounted between the two halves 18, 19 is a knife means 20, preferably in the form of a generally circular element having a sharpened outer edge. By means of an interrupted or stepped surface at the mating location of the halves 18, 19 of the drum 16, the knife means 20 is caused to lie on a spiral path consistent with the spiral threading of the drum 16. Such threaded drum constructions and knife means therefore are known from prior disclosures.

Suitable drive means, such as an electrical motor 21 and a gear head transmission 22 therefore are provided for driving the shaft 15 and drum 16 in rotation.

Tire mounting means generally indicated at 24 is provided for supporting a tire 25 in engagement with the drum 16. The tire mounting means 24 includes a shaft 26 which defines a second axis about which the tire 25 rotates during engagement with the drum 16. For convenience in mounting a tire, the shaft 26 may have a wheel portion 28 for receiving a rim on which a tire 25 is mounted.

In accordance with an important characterizing feature of this invention, the tire mounting means 24 further includes spacing means for linearly moving the shaft 26 laterally relative to the drum 16 while maintaining the axis of the shaft 26 in constant predetermined skew relation to the axis of rotation of the drum 16. In the form illustrated, the spacing means comprises a pair of standards respectively generally indicated at 30 and 31 which rise upwardly from the floor plate 11 of the base 10 of the tire siping machine. Each standard 30, 31 preferably has a generally square cross-sectional configuration with an upper end which opens upwardly and inwardly toward the location of a tire 25 undergoing siping. Each upper end of a standard is preferably drilled to receive a corresponding one of a pair of locking pins 32, 33. In use, the locking pins 32, 33 secure in position in the standards 30, 31 bearing blocks 36, 37 mounted on respective ends of the tire mounting shaft 26. For purposes to be brought out more fully hereinafter, the tire mounting shaft 26 additionally has a collar 38 attached thereto from which a radial pin 39 projects.

Each of the standards 30, 31 functions as an extensible and retractable column member extending perpendicular to the shaft 26. The standards 30, 31 are spaced one from the other for straddling a mounted tire 25 (FIG. 4) and are operatively connected with a drive means for controllably extending and retracting upper portions of the standards. By such extension and retraction, in parallel, the shaft 26 is moved through a range of positions while maintaining the shaft in the same skew relation to the drum shaft 15 at all such positions. This is distinguished from the pivotal motion encountered in prior siping machines as mentioned hereinabove.

Figure 4:
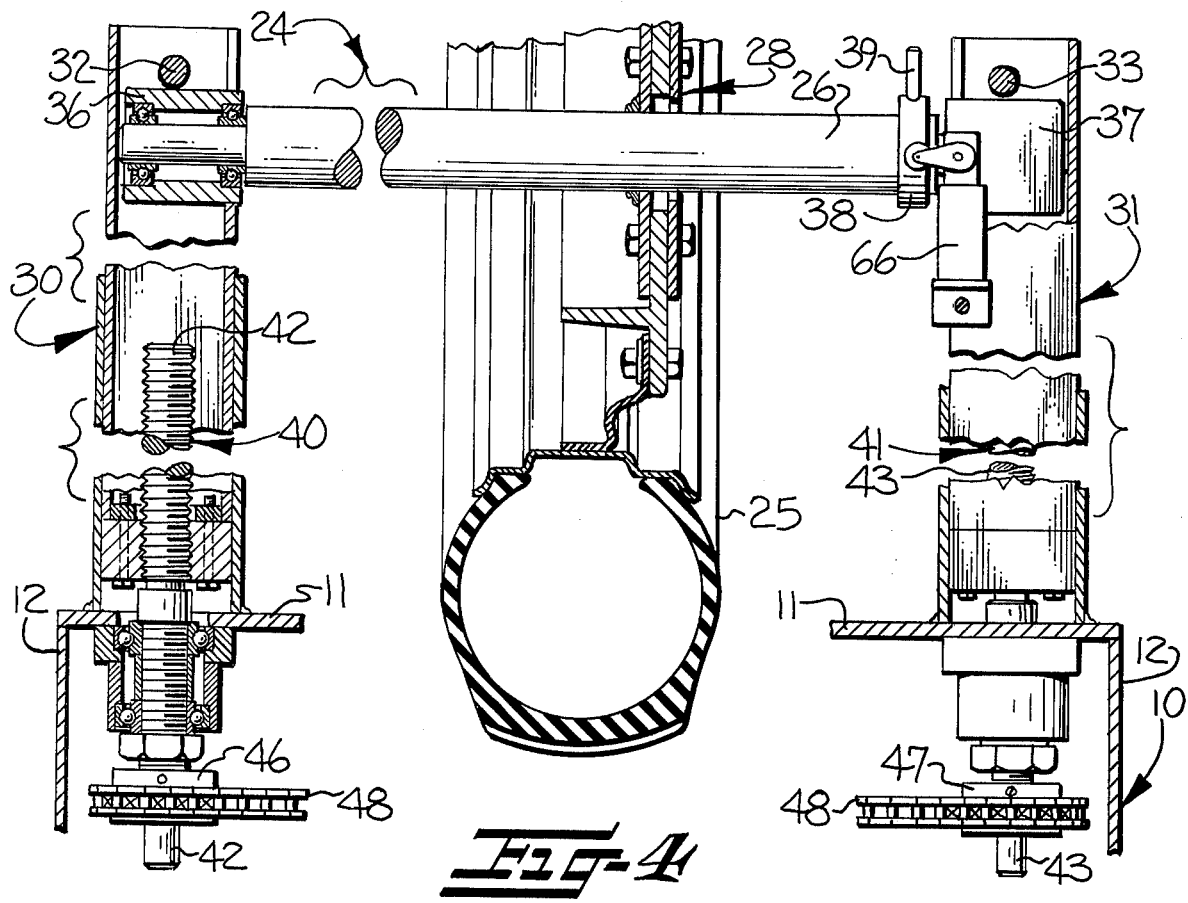
FIG. 4 is an enlarged, partial elevation view, partially in section, taken generally along the line 4—4 in FIG. 1.

In the form illustrated, the drive means comprises first and second screw jack means respectively generally indicated at 40 and 41. Each screw jack means 40, 41 comprises a threaded rod member 42, 43 having a sprocket 46, 47 adjacent a lower end thereof. The sprockets 46, 47 are joined by a drive chain 48 which additionally is entrained about an idler sprocket 49. The chain 48 and the sprockets 46, 47 are driven by a suitable electrical motor 50 through a gear head 51, drive chain 52 and drive sprockets 54, 55. As will be appreciated, rotation of the threaded members 42, 43 in a common direction and at a commond speed will extend and retract upper portions of the standards 30, 31 due to the engagement of the respective threaded members with nut portions 56, 57 (FIG. 4). As a result, the opposite ends of the tire mounting shaft 26 are moved in linear, co-directional lateral movement. Further, control over actuation of the jacks provides for imposing controlled loading force between a tire undergoing siping and the threaded drum.

Referring now once again to FIG. 1, the apparatus will be noted to include a tire lift standard 60 mounting a cross beam 61 from which an actuating cylinder 62 and a lift chain 64 extend. By means of the lift chain 64 and a lifting bracket 65, the shaft 26 and a tire mounted thereon may be lifted from or mounted on the standards 30, 31.

The standard 31 adjacent the end of the shaft 26 bearing the collar 38 with a radial pin 39 will additionally be noted to mount a limit switch 66. Preferably, the limit switch 66 is electrically interconnected with the drive motor 21 for the threaded drum 16. On positioning a tire 25 in preparation for siping, the radial pin 39 preferably is disposed immediately adjacent an actuating lever for the limit switch 66. Thereafter, during operation of the siping machine, the radial pin 39 will actuate the limit switch 66 upon the tire 26 completing a single revolution, thereby interrupting operation of the siping machine in response to a single revolution of the tire 25.

In the drawings and specification, there has been set forth a preferred embodiment of the invention, and although specific terms are employed, they are used in a generic and descriptive sense only and not for purposes of limitation.

That which is claimed is:

1. In a tire siping machine having a spirally threaded drum mounted for rotation about a first axis, knife means projecting from said drum for cutting a tire brought into engagement with said drum, and tire mounting means for supporting a tire in engagement with said drum and including shaft means defining a second axis about which a tire rotates during drum engagement, the improvement in said mounting means which comprises first and second extensible and retractable column members each extending perpendicular to said shaft means, said column members being spaced one from the other for straddling a mounted tire; first and second jack means each operatively connected with a corresponding one of said column members; and common motive means operatively connected with both said jack means for driving said column members in parallel, co-directional extension and retraction; said means cooperating for linearly moving said shaft means laterally relative to said drum while maintaining said second axis in constant predetermined skew relation to said first axis.

2. Apparatus according to claim 1 wherein said machine further has drive means for driving said drum in rotation and further comprising means operatively associated with said shaft means and operatively connected to said drive means for interrupting operation in response to said shaft means completing a single revolution.

3. A tire siping machine comprising spirally threaded drum means driven in rotation about a first axis, knife means projecting from said drum for cutting a tire brought into engagement with said drum, shaft means for supporting a tire in engagement with said drum and defining a second axis about which a tire rotates during drum engagement, jack means for controllably moving said shaft means linearly in a lateral direction relative to said drum for maintaining said second axis in constant predetermined skew relation to said first axis, and means responsive to said shaft means completing a single revolution for interrupting operation of said siping machine in response thereto.

* * * * *